United States Patent
Jeffries et al.

(10) Patent No.: US 7,142,552 B2
(45) Date of Patent: Nov. 28, 2006

(54) METHOD AND SYSTEM FOR PRIORITY ENFORCEMENT WITH FLOW CONTROL

(75) Inventors: Clark Debs Jeffries, Durham, NC (US); Andreas Kind, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 926 days.

(21) Appl. No.: 10/117,814

(22) Filed: Apr. 8, 2002

(65) Prior Publication Data

US 2003/0189934 A1 Oct. 9, 2003

(51) Int. Cl.
*H04L 12/28* (2006.01)
*H04L 12/56* (2006.01)

(52) U.S. Cl. ............... 370/413; 370/414; 370/416; 370/418; 370/253; 370/230.1

(58) Field of Classification Search ........ 370/230.1, 370/253, 413, 416, 417, 418, 419, 412, 231, 370/232, 233, 234, 235, 235.1, 236, 252, 370/428, 429, 395.4, 414, 415
See application file for complete search history.

(56) References Cited

U.S. PATENT DOCUMENTS

| | | | |
|---|---|---|---|
| 4,933,933 A | 6/1990 | Dally et al. .......... 370/60 |
| 5,354,848 A | 10/1994 | Falagiani et al. ...... 530/395 |
| 5,555,264 A | 9/1996 | Sällberg et al. ....... 370/17 |
| 5,859,837 A | 1/1999 | Crayford .............. 370/230 |
| 5,983,278 A | 11/1999 | Chong et al. .......... 709/235 |
| 6,188,670 B1 | 2/2001 | Lackman et al. ....... 370/231 |
| 6,212,162 B1 | 4/2001 | Hörlin ................ 370/229 |
| 6,212,582 B1 | 4/2001 | Chong et al. .......... 710/57 |
| 6,657,960 B1 * | 12/2003 | Jeffries et al. ........ 370/230.1 |
| 6,725,270 B1 * | 4/2004 | Yu et al. .............. 709/229 |
| 6,769,033 B1 * | 7/2004 | Bass et al. ............ 709/246 |
| 6,816,494 B1 * | 11/2004 | Raza ................. 370/395.41 |
| 6,870,811 B1 * | 3/2005 | Barker et al. ......... 370/235 |
| 2003/0169688 A1 * | 9/2003 | Mott ................. 370/230 |
| 2003/0189943 A1 * | 10/2003 | Gorti et al. .......... 370/412 |

* cited by examiner

*Primary Examiner*—Huy D. Vu
*Assistant Examiner*—Chuong Ho
(74) *Attorney, Agent, or Firm*—Joscelyn G. Cockburn; Patrick J. Daugherty; Driggs, Hogg & Fry Co., LPA (57) ABSTRACT

A method and system for controlling a plurality of pipes in a computer network, including at least one processor for a switch, the at least one processor having a queue, the plurality of pipes utilizing the queue for transmitting traffic through the switch, wherein each pipe is assigned a priority ranking class, each class has a unique priority rank with respect to each of the other classes, the ranks ranging from a highest priority rank to a lowest priority rank. A transmission probability is calculated for each pipe responsive to its priority rank. If excess bandwidth exists for the queue, the transmission probability of each pipe is linearly increased. Alternatively, if excess bandwidth does not exist, the transmission probability for each pipe is exponentially decreased. Packets are transferred from a pipe to the queue responsive to the pipe transmission probability and priority rank.

15 Claims, 7 Drawing Sheets

Prior Art

Prior Art

Figure 2B

Prior Art

METHOD AND SYSTEM FOR PRIORITY ENFORCEMENT WITH FLOW CONTROL

FIELD OF THE INVENTION

The present invention relates to computer networks and, more particularly, to a method and system for providing priority bandwidth allocation with simple flow control.

BACKGROUND OF THE INVENTION

Figure 1:
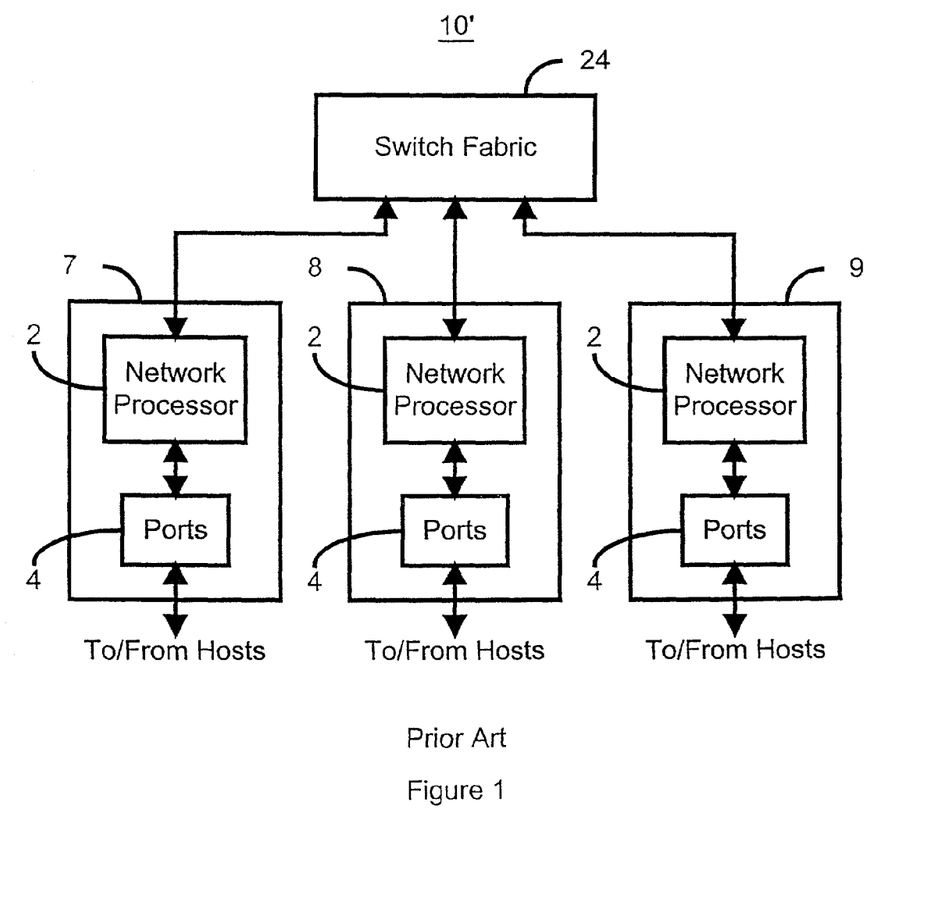
FIG. 1 is a high-level block diagram of a switch.

Driven by increasing usage of a variety of network applications, such as those involving the Internet, computer networks are of increasing interest. In order to couple portions of a network together or to couple networks, switches are often used. For example, FIG. 1 depicts a high-level block diagram of a switch 10 which can be used in a computer network. The switch 10 includes a switch fabric 24 coupled with blades 7, 8 and 9. Each blade 7, 8 and 9 is generally a circuit board and includes at least a network processor 2 coupled with ports 4. Thus, the ports 4 are coupled with hosts (not shown). The blades 7, 8 and 9 can provide traffic to the switch fabric 24 and accept traffic from the switch fabric 24. Thus, any host connected with one of the blades 7, 8 or 9 can communicate with another host connected to another blade 7, 8 or 9 or connected to the same blade.

Figure 2A:
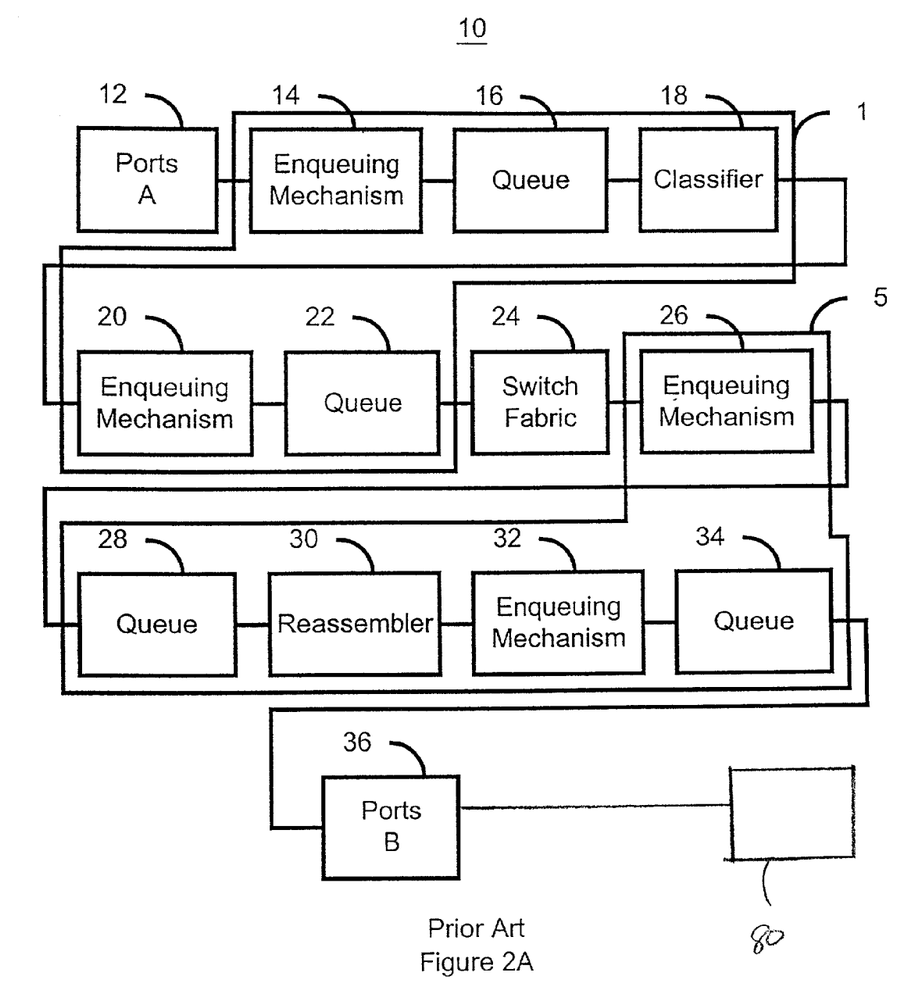
FIG. 2A is a simplified block diagram of a switch.

FIG. 2A depicts another simplified block diagram of the switch 10, illustrating some of the functions performed by network processors. The switch 10 couples hosts (not shown) connected with ports A 12 with those hosts (not shown) connected with ports B 36. The switch 10 performs various functions, including classification of data packets provided to the switch 10, transmission of data packets across the switch 10 and reassembly of packets. These functions are provided by the classifier 18, the switch fabric 20 and the reassembler 30, respectively. The classifier 18 classifies packets which are provided to it and breaks each packet up into convenient-sized portions, which will be termed cells. The switch fabric 24 is a matrix of connections through which the cells are transmitted on their way through the switch 10. The reassembler 30 reassembles the cells into the appropriate packets. The packets can then be provided to the appropriate port of the ports B 36, and output to the destination hosts. The classifier 14 may be part of one network processor 1, while the reassembler 30 may be part of another network processor 5. The portions of the network processor 1 and the network processor 5 depicted perform functions for traffic traveling from ports A 12 and to ports B 36, respectively. However, the network processors 1 and 5 also perform functions for traffic traveling from ports B 36 and to ports A 12, respectively. Thus, each network processor 1 and 5 can perform classification and reassembly functions. Furthermore, each network processor 1 and 5 can be a network processor 2 shown in FIG. 1.

Referring back to FIG. 2A, due to bottlenecks in transferring traffic across the switch 10, data packets may be required to wait prior to execution of the classification, transmission and reassembly functions. As a result, queues 16, 22, 28 and 34 may be provided. Coupled to the queues 16, 22, 28 and 34 are enqueuing mechanisms 14, 20, 26 and 32. The enqueuing mechanisms 14, 20, 26 and 32 place the packets or cells into the corresponding queues 16, 22, 28 and 34 and can provide a notification which is sent back to the host from which the packet originated.

Figure 2B:
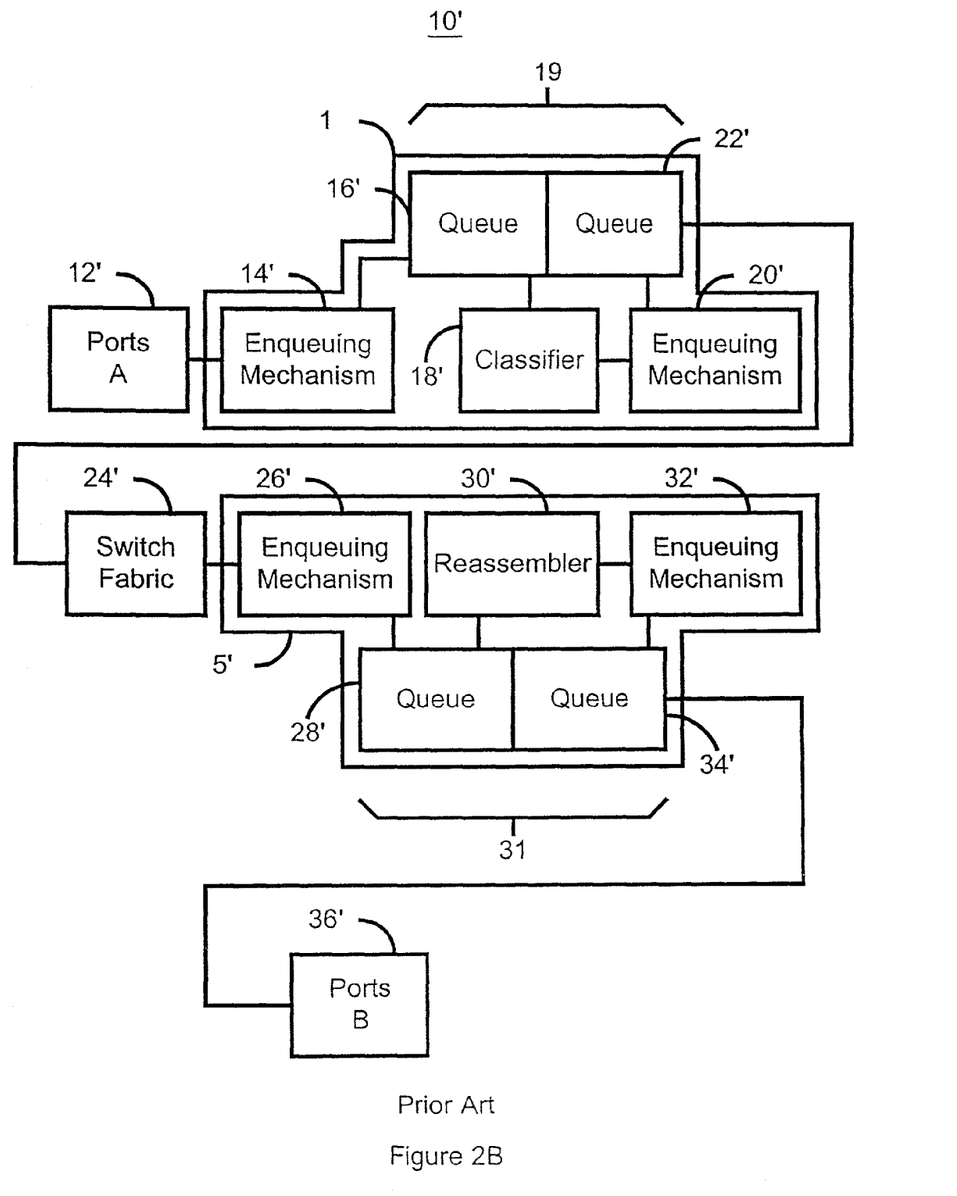
FIG. 2B is a simplified block diagram of another switch.

Although the queues 16, 22, 28 and 34 are depicted separately, one of ordinary skill in the art will readily realize that some or all of the queues 16, 22, 28 and 34 may be part of the same physical memory resource. FIG. 2B depicts one such switch 10'. Many of the components of the switch 10' are analogous to components of the switch 10. Such components are, therefore, labeled similarly. For example, the ports A 12' in the switch 10' correspond to the ports A 12 in the switch 10. In the switch 10', the queue A 16 and the queue B 22 share a single memory resource 19. Similarly, the queue C 28 and the queue D 34 are part of another single memory resource 31. Thus, in the switch 10', the queues 16, 22, 28 and 34 are logical queues partitioned from the memory resources 19 and 31.

Currently, most conventional switches 10 treat flows of traffic across the network, in which the switch is used, the same. There is, however, a trend toward providing customers with different services based, for example, on the price paid by a consumer for service. A consumer may wish to pay more to ensure a faster response or to ensure that the traffic for the customer will be transmitted, even when traffic for other customers is dropped due to congestion. Thus, the concept of differentiated services has been developed. Differentiated services can provide different levels of service, or flows of traffic through the network, for different customers.

DiffServ is an emerging Internet Engineering Task Force (IETF) standard for providing differentiated services (see IETF RFC 2475 and related RFCs). DiffServ is based on behavior aggregate flows. A behavior aggregate flow can be viewed as a pipeline from one edge of the network to another edge of the network. Within each behavior aggregate flow, there could be hundreds of sessions between individual hosts. However, DiffServ is unconcerned with session within a behavior aggregate flow. Instead, DiffServ is concerned with allocation of bandwidth between the behavior aggregate flows. According to DiffServ, excess bandwidth is to be allocated fairly between behavior aggregate flows. Furthermore, DiffServ provides criteria, discussed below, for measuring the level of service provided to each behavior aggregate flow.

Figure 3:
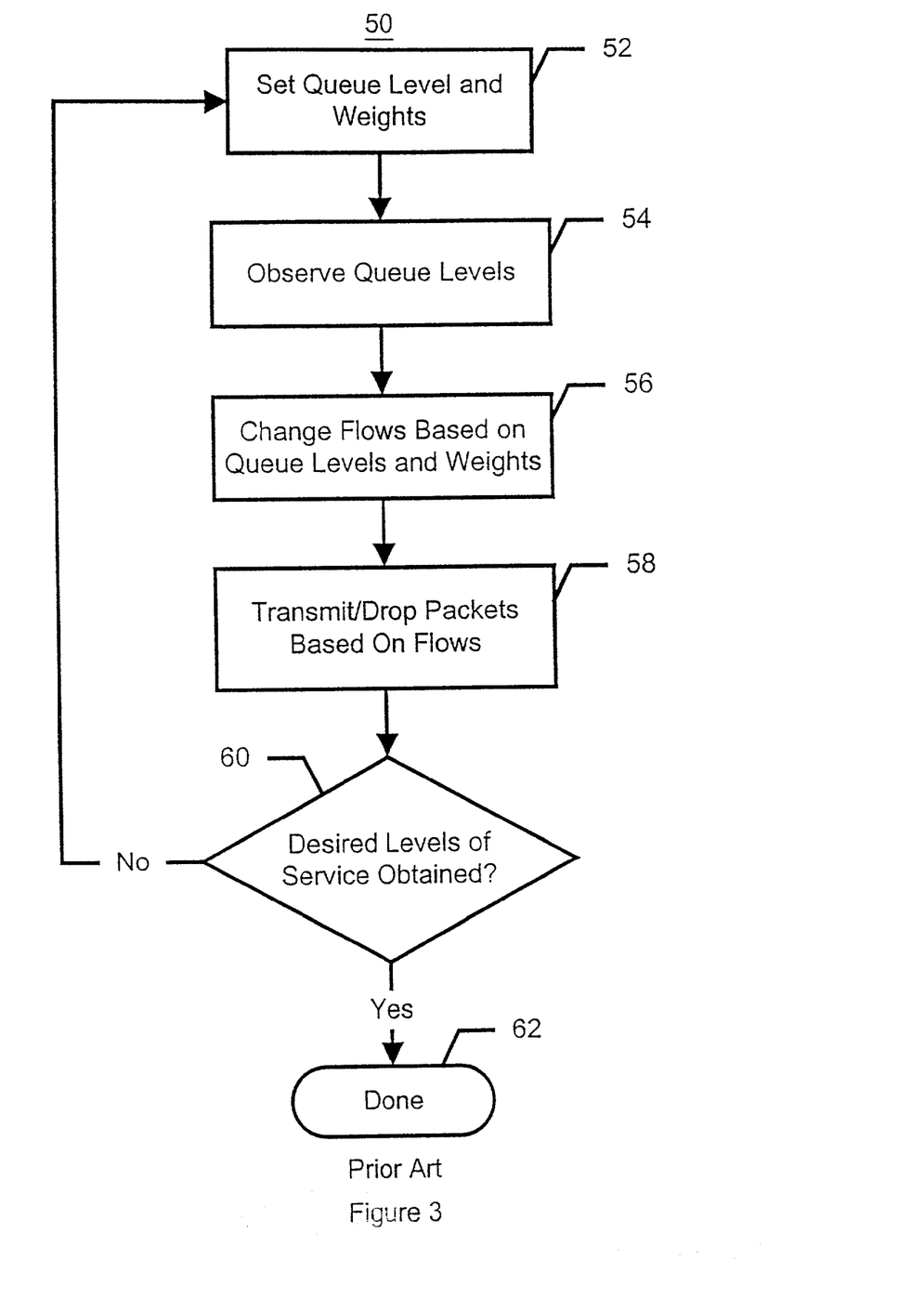
FIG. 3 is a flow chart depicting a conventional method for providing different levels of service through a switch.

One conventional mechanism for providing different levels of services utilizes a combination of weights and a queue level to provide different levels of services. FIG. 3 depicts such a conventional method 50. The queue level thresholds and weights are set, via step 52. Typically, the queue level thresholds are set in step 52 by a network administrator turning knobs. The weights can be set for different pipes or flows, through a particular queue, switch 10 or network processor 1 or 5. Thus, the weights are typically set for different behavior aggregate flows. The queue levels are observed, typically at the end of a period of time known as an epoch, via step 54. The flows for the pipes are then changed based on how the queue level compares to the queue level threshold and on the weights, via step 56. Flows for pipes having a higher weight undergo a greater change in step 56. The flow for a pipe determines what fraction of traffic offered to a queue, such as the queue 15, by the pipe will be transmitted to the queue 16 by the corresponding enqueuing mechanism, such as the enqueuing mechanism 14. Traffic is thus transmitted to the queue or dropped based on the flows, via step 58. A network administrator then determines whether the desired levels of service are being met, via step 60. If so, the network administrator has completed his or her task. However, if the desired level of service is not achieved, then the queue level thresholds and, possibly the weights, are reset via step 52, and the method 50 repeats.

Although the method 50 functions, one of ordinary skill in the art will readily realize that it is difficult to determine what effect changing the queue level thresholds will have on particular pipes through the network. Thus, the network administrator using the method 50 may have to engage in a great deal of experimentation before reaching the desired flow rate for different customers, or pipes (behavior aggregate flows) in a computer.

Moreover, "Absolute priority bandwidth allocation" is required by some customers. This means that traffic is organized into N priorities with N>1. Each pipe may be assigned a priority class, with each class conventionally designated from highest priority to lowest by the labels P0, P1, ..., PN-1. The lowest priority PN-1 might be also called "Best Effort." For example, for a given customer, an email data packet may not require rapid delivery, such as within one second, but the customer may require that a file transfer protocol (FTP) session involving an inventory update be transmitted as soon as possible. Therefore, the FTP file may be assigned the highest priority, and the email a lower priority.

Absolute priority bandwidth allocation typically means that if any Pi packets are awaiting service in a queue, then they must all be served before any Pi+1 packets. With infinite storage and infinite time to live (no expiration date and constant value over time), one could go through all stored packets of one priority class on a first-in/first-out basis (FIFO), and then serve all of the packets of next priority class. However, if the amount of system storage is finite, or if the time to live of a packet is finite (as is almost always the case), then the definition and practice of optimal performance with priority becomes difficult. In particular, strict adherence to priority might in some cases imply that if the lowest class, "Best Effort", is ever served, then only very stale Best Effort packets are processed on a FIFO basis. Therefore, the concept of absolute priority bandwidth allocation requires clarification in any real system.

The goal of approximating absolute priority bandwidth allocation must be balanced with other goals as follows:

(1) good approximation of absolute priority bandwidth allocation with finite storage capacity and limited "times to live" for packets handled;

(2) high utilization of the processor;

(3) fast reaction to changing mixes of offered traffic and, in particular, fast allocation to a burst of relatively high priority traffic;

(4) simplicity of implementation;

(5) flexibility (handling any number of priorities, preferably up to about eight);

(6) resistance to storage overflow for oversubscription, preferably up to about four to one (overflow would cause dropping of the next packet regardless of priority); and (7) stability as the mix priorities and rates of offered traffic change, wherein the system does not severely punish low priority traffic due to a brief burst of high priority traffic.

What is needed is a system and method for absolute priority bandwidth allocation that can meet the above seven goals.

SUMMARY OF THE INVENTION

The present invention provides a method and system for approximating absolute priority bandwidth allocation with simple flow control. Flow control is used to examine each packet as it arrives, recognize each packet by priority, and either transmit it into a queue ("enqueue it") or discard it. This is done probabilistically. The probability of transmission of a packet with priority i, called the transmit probability Ti, can be any value in [0, 1]. The invention uses the concept of linear increase, exponential decrease of each Ti to endow a shared processing resource with the property of priority. This enables the shared resource to transmit all of the highest priority packets before those of a lower priority. The shared processing resource used by all priorities is monitored for congestion and each Ti is adjusted accordingly with a fixed period Dt.

DETAILED DESCRIPTION OF THE INVENTION

The present invention provides a method and system for approximating absolute priority bandwidth allocation with simple flow control. The invention will be described in terms of a particular system and particular components. However, one of ordinary skill in the art will readily recognize that this method and system will operate effectively for other components in a computer network. The present invention will also be described in the context of a queue. However, one of ordinary skill in the art will readily recognize that the present invention functions effectively when queues are logical queues part of a single memory resource or when the queues are part of separate memory resources. Furthermore, the present invention functions analogously when controlling flows into a subqueue of a particular logical queue. The present invention will also be discussed in terms of controlling network flows by proactively discarding packets. However, one of ordinary skill in the art will readily realize that the method and system control the rate of packets arriving in a queue and that a signal sent to a source and dictating a fraction of packets to be sent, with others held at the source, would be effective. Therefore, control of a transmission fraction is analogous control of a rate at which packets are offered, for example by one or more sources. Furthermore, the present invention will be described in terms of pipes, or flows provided to a queue. However, one of ordinary skill in the art will readily realize that the pipes could be behavior aggregate flows of different or the same class or any offered rate into a particular component which utilizes a queue for storage.

Figure 4:
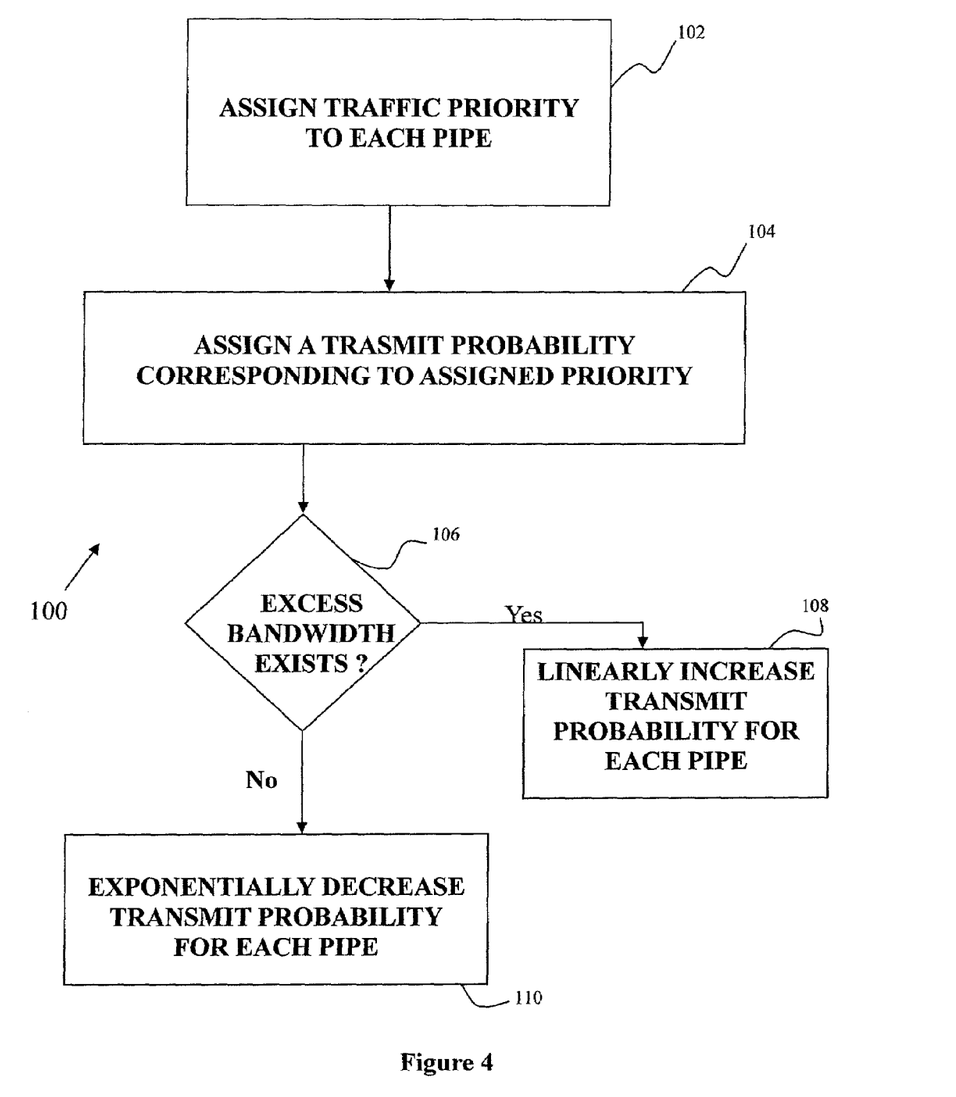
FIG. 4 is a flow chart depicting a method and system in accordance with the present invention for absolute priority bandwidth allocation.
Figure 5:
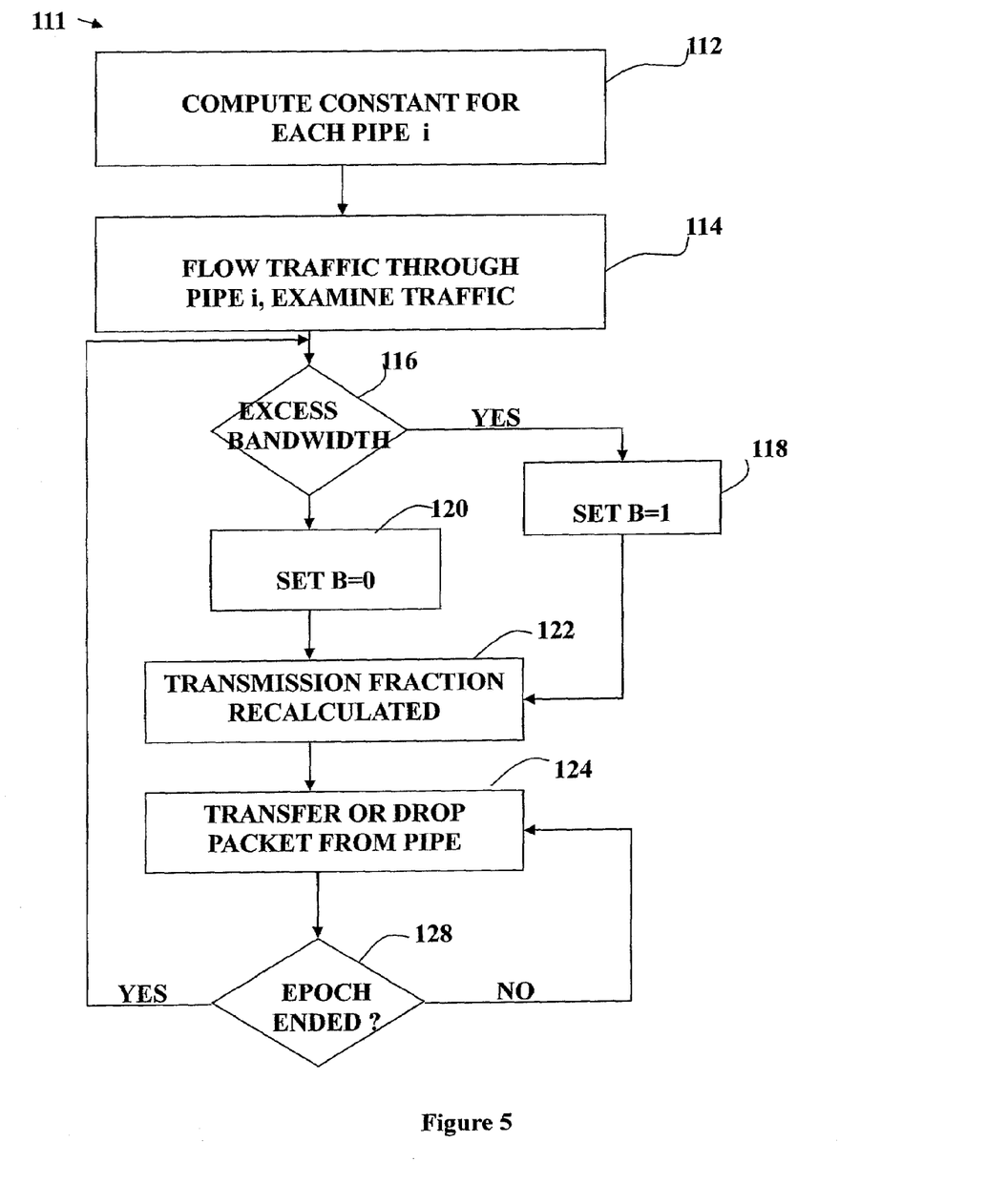
FIG. 5 is another flow chart depicting a method and system in accordance with the present invention.

To more particularly illustrate the method and system in accordance with the present invention, refer now to FIG. 4, depicting one embodiment of a flow control method 100 in accordance with the present invention. The flow control method 100 is preferably accomplished using the apparatus disclosed in U.S. patent application Ser. No. 09/384,691, filed on Aug. 27, 1999, entitled "NETWORK PROCESSING COMPLEX AND METHODS" and assigned to the assignee of the present application. Applicants hereby incorporate by reference the above-mentioned U.S. patent application disclosure. The method 100 can be used with the switch 10 or 10' shown in FIGS. 1, 2A and 2B. Thus, the method 100 can be carried out in a switch 10 having multiple blades 7, 8 and 9 and multiple ports on each blade 7, 8 or 9. For the purposes of clarity, the method 100 will be explained in conjunction with the queue 16 and enqueuing mechanism 14 depicted in FIG. 2A. However, the method 100 can be used with other queues, such as the queues 22, 28, 34, 16', 22', 28' and 34'. The method 100 can also be used with other enqueuing mechanisms, such as the enqueuing mechanisms 20, 26, 32, 14', 20', 26' and 32'. In a preferred embodiment, the method 100 is used in a system in which multiple queues are part of the same memory resource. However, nothing prevents the method 100 from being used in another system in which each queue has a separate memory resource. Furthermore, the method 100 will be described in the context of pipes; however, the method 100 can be used for a variety of components, including behavior aggregate flows, which correspond to pipes.

Flow control method 100 examines each packet as it arrives, recognizes each packet by priority, and either transmits it into the queue ("enqueue it") or discards it. This is done probabilistically. The probability of transmission of a packet with priority i, called the transmit probability Ti, can be any value in [0, 1]. The invention uses the concept of linear increase, exponential decrease of each Ti. This means a shared processing resource used by all priorities is monitored for congestion and each Ti is adjusted accordingly with a fixed period Dt.

In step 102, according to conventional "absolute priority bandwidth allocation", packet traffic is organized into N priorities with N>1, with each pipe assigned a priority class, for example by a network administrator. Conventionally, each class is designated from highest priority to lowest by the labels P0, P1, . . . , PN-1. The lowest priority PN-1 might be also called "Best Effort." In step 104, each pipe i is assigned a transmit probability corresponding to its priority. Each pipe i offers traffic to the queue 16 at an offered rate, $I_i(t)$, where i denotes the $i^{th}$ pipe. Depending on different factors, some of the traffic may be dropped. The transmission fraction for the $i^{th}$ pipe, $T_i(t)$, is the fraction of traffic from the $i^{th}$ pipe which is transmitted to the queue 16. Thus, the instantaneous flow for the $i^{th}$ pipe is $f_i(t)=I_i(t)*T_i(t)$. In a preferred embodiment, the method 100 can also ensure that the pipes having traffic flowing through them have at least their minimum flows.

In step 106 the system and method assesses whether excess bandwidth or congestion exists. With regard to the present invention, "excess bandwidth" preferably means either that the number of packets awaiting processing by the switch 10 is small compared to a specified threshold, or is decreasing compared to a specified threshold. If excess bandwidth is determined, then step 108 is indicated. One example of a specified threshold appropriate for the present embodiment is about 25% of the available occupancy of an associated data storage system 80. Other thresholds will be readily apparent to one skilled in the art, and the invention is not limited to this example. However, where either the number of packets awaiting processing by the switch 10 is large compared to a specified threshold, or is increasing compared to a specified threshold, "Congestion" (the absence of excess bandwidth) is present and step 110 is indicated.

However, nothing prevents the use of another criteria with the present invention for determining whether excess bandwidth exists. For example, in an alternative embodiment, excess bandwidth may be determined in step 106 not to exist if a queue level is increasing. Or excess bandwidth may be determined to exist in step 106 if a queue 16 is empty, or if the queue level for the queue 16 is decreasing. Also, in an alternative embodiment, excess bandwidth may be determined in step 106 not to exist if the queue level is not either zero or decreasing. Thus, step 106 preferably includes determining a queue level or other threshold and comparing the queue level or other threshold to a previous queue level or other threshold.

One advantage of the present invention is that the queue 16 is one shared processing resource, preferably a "first-in/first-out" ("FIFO") queue. The logic and system resources required to operate a FIFO queue are simplified and economically superior to other types of queue structures. For example, some prior art systems assign a unique priority to each of a series of queues, which must be in turn be controlled by a scheduler system. When an event occurs in the prior art system, the scheduler identifies each queue and serves the highest priority queue until all of its traffic has passed, then identifies and serves the next in priority, and so on. In contrast, the present invention enables one FIFO queue 16 to serve all of the pipes, wherein their relative priority determines how they will write to the one FIFO queue 16, and the scheduler merely takes the next packet in the FIFO queue 16. The packets are placed in the queue 16 by the present invention, unless they are dropped, on the basis of the congestion status of the queue and the value assigned to the packet. Although the present invention is not qualitatively the same as strict priority allocation through a scheduler and multiple queues, it provides a good approximation of the prior art complex scheduler and multiple queue system by finding the packet with highest priority and sending it next.

However, it is to be understood that other types of queues may be used with the present invention and, accordingly, the present invention is not limited to systems and methods using only one FIFO queue.

What is important is that all the pipes i may be polled simultaneously in step 106 to determine whether excess bandwidth is available. And when excess bandwidth is available in all of the pipes i, then in step 108 the transmit probability of each pipe i may be increased linearly with a certain linear coefficient Ci. However, when congestion occurs (there is no excess bandwidth), then in step 110 the transmit probability of every pipe i may be decreased exponentially with a certain exponential coefficient Di. This is important in that only one signal is required for all of the pipes, in contrast to prior art systems and methods that may require more than one signal, such as where each pipe may require a unique signal.

Figure 6:
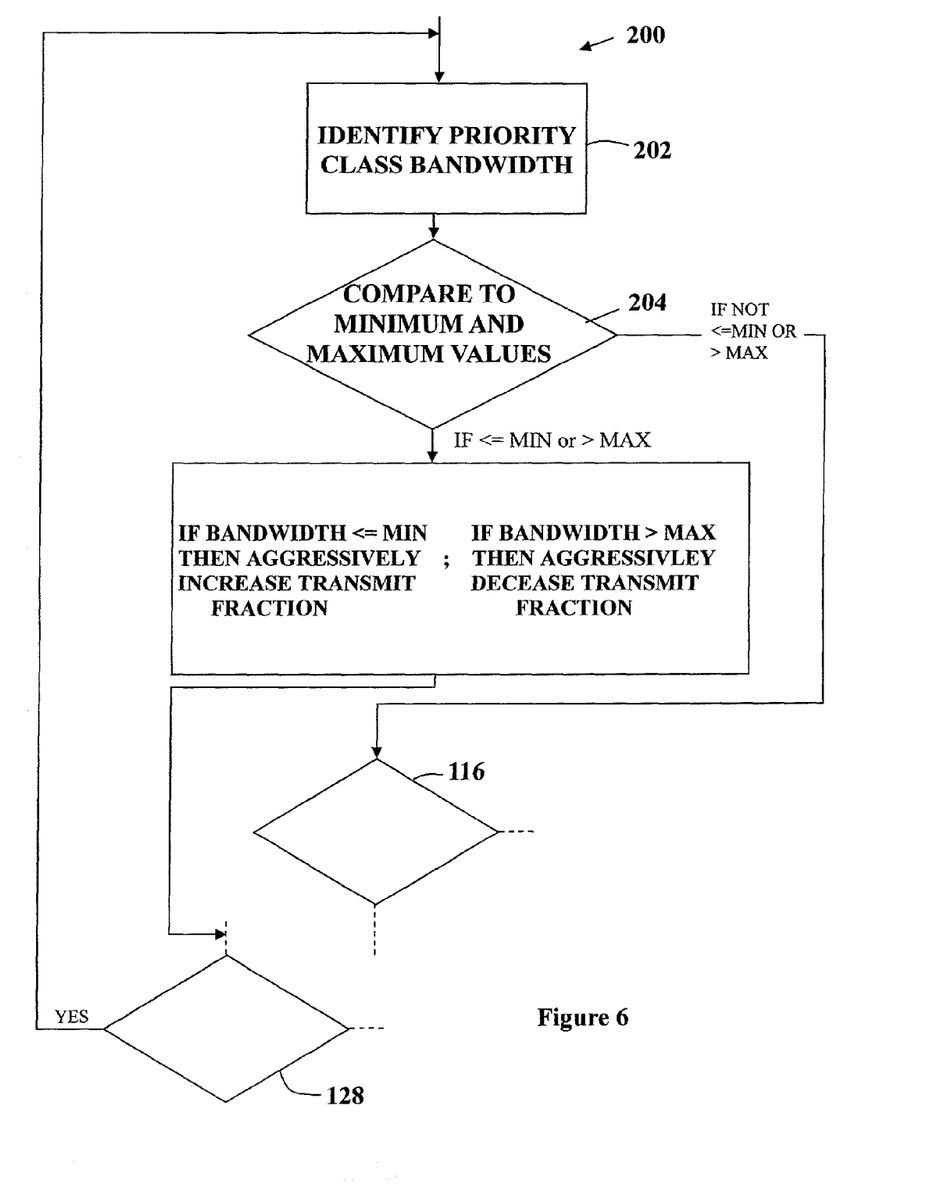
FIG. 6 is another flow chart depicting a method and system in accordance with the present invention.

If there are N priority pipes with labels 0, 1, 2, . . . , N-1, then let:

$C0=1/128$ and $Ci+1=Ci/2$ for $i=0, 1, \ldots, N-2$; and $DN-1=1/128$ and $Di=(Di+1)/2$ for $i=N-2, N-3, \ldots, 0$ FIG. 6 illustrates an application 111 of the above coefficients according to the present invention. In step 112, the constants Ci and Di are computed for each pipe i pursuant to the above equations. In step 114 arriving traffic is examined to determine its type i. The probability Ti, or "transmission fraction," is the probability that an arriving frame will be transmitted into a buffer to await processing. The probability 1-Ti is the probability that the same frame will be discarded. The probability Ti of transmitting (as opposed to discarding) a frame of type i is adjusted as follows. Every time interval Dt is updated, where Dt=Length of an epoch (time since transmission fraction last calculated). During a time interval [t-Dt, t], in step 116, a measurement is made that defines the existence of excess bandwidth. This measurement B is set to a value of 1 in step 118 if excess bandwidth exists. Alternatively, the measurement B is set to a value of 0 in step 120 if excess bandwidth does not exist. In a preferred embodiment, the value of B is 1 if a storage buffer has an occupancy less than or equal to one fourth of its maximum capacity; else, B is 0.

The transmission fraction is then recalculated in step 122 responsive to the B value according to the following equations:

If $B=1$, then $Ti(t+Dt)=\text{minimum } \{Ti(t)+Ci, 1\}$;

If $B=0$, then $Ti(t+Dt)=\text{maximum } \{0, Ti(t)-Di*fi/S\}$.

Here the symbol fi denotes the amount of traffic of type i that was transmitted during time interval [t–Dt, t] divided by Dt, that is, the average rate of traffic of type i over time interval [t–Dt, t]. The symbol S denotes the maximum possible rate of traffic of all types that could be sent to or from the buffer. The use of Ci, Di is taught in U.S. patent application Ser. No. 09/384,691, filed on Aug. 27, 1999, and entitled "NETWORK PROCESSING COMPLEX AND METHODS," previously incorporated in this specification; and in U.S. patent application Ser. No. 09/448,197, filed on Nov. 23, 1999, entitled "METHOD AND SYSTEM FOR PROVIDING DIFFERENTIATED SERVICES IN COMPUTER NETWORKS" and assigned to the assignee of the present application, the disclosure of which applicants hereby incorporate by reference. What is new is the selection of values for a pipe i by a specified relationship with another pipe i and, more particularly, with the ratio 1/2.

Using the transmission fraction calculated above, in step 124 packets passing through the switch 10 are transferred or dropped during the epoch. In a preferred embodiment, packets are dropped based not only on the transmission fraction for the pipe in which they are flowing, but also on the priority of each packet. In another embodiment, the packets are dropped randomly. In step 128, it is determined whether the epoch is completed. If not, then traffic continues to be transferred based on the same transmission fractions in step 124. If the epoch has finished, then the method repeats commencing with step 116.

Obviously, if the transmit probability of Pi increases twice as fast as that of Pi+1 during excess congestion, and then decreases half as fast as that of Pi+1 during congestion, then a higher fraction of Pi will be transmitted than that of Pi+1. What is new, novel and non-obvious is that the combination is a good approximation of absolute priority bandwidth allocation. In the present embodiment, the ratio of 1:2 is used because, with a maximum of $1/128$ and a minimum binary value with 15 places of 1/32768, this allows up to 9 levels of priority. The ratio 1:2 is, therefore, a preferred embodiment, not a necessity to the theory of the invention, and other ratio values will be apparent to one skilled in the art.

Because the method 100 increases transmit probability linearly and decreases transmit probability exponentially, the method 100 generally ensures that the traffic through pipes to the queue 16 can automatically and asymptotically reach stability. Transmit probabilities will increase or decrease depending upon whether the queue 16 has excess bandwidth. When stability is reached, transmit probabilities will linearly increase as long as excess bandwidth exists, then will exponentially decrease, due to the lack of excess bandwidth, until excess bandwidth again becomes available. This behavior will repeat. In other words, the traffic from the pipes can settle into a steady cyclic state known as a limit cycle. Thus, regardless of the state in which the traffic through the pipes commences, the system will move toward stable cyclic behavior. This stable behavior may not be achieved with another combination of increases and decreases. For example, an exponential increase and a linear decrease or an exponential increase and an exponential decrease may not produce stable behavior. Furthermore, the increase and decrease in the transmit probability for each pipe will depend upon the current transmit probability set for the pipe and the previous transmit probability for the pipe and, therefore, ultimately upon the initial transmit probability set for that pipe. Thus, different pipes will have different transmit probabilities at any time based upon the differences in their initial transmit probability. Consequently, the method 100 cannot only allocate produce stable behavior, but can also provide differentiated services and allocate excess bandwidth for the queue 16 fairly. All a network administrator or other user must do is set the initial transmit probabilities for each pipe differently depending upon the level of service desired for the particular customer utilizing that pipe. Thus, the method 100 can be used in a variety of applications, such as in networks using DiffServ, by internet service providers desiring to provide different levels of service to different customers or for different media. This is accomplished by setting specific transmit probabilities for the customers, the media, classes or other flows corresponding to the pipes in the method 100.

In one embodiment of the present invention, six priorities are provided for six pipes 0, 1, . . . , 5 with the following coefficients:

$C0=1/128, C1=1/256, \ldots, C5=1/4096$; and $D5=1/128, D4=1/256, \ldots, D0=1/4096$.

Thus, the higher priority pipes increase faster when there is excess bandwidth and decrease slower when there in congestion. The effect can be similar to that of absolute priority allocation, as the following data show. The following tables illustrate typical queuing theory results from the present embodiment after 4,000 updates (all expressed as percentages of processing capacity):

TABLE 1

| Priority | Offered | Ideal | Actual |
|---|---|---|---|
| 0 | 40 | 40 | 40 |
| 1 | 10 | 10 | 10 |
| 2 | 30 | 30 | 30 |
| 3 | 10 | 10 | 10 |
| 4 | 50 | 10 | 8 |
| 5 | 100 | 0 | 2 |
| Total: | 240% | | |

TABLE 2

| Priority | Offered | Ideal | Actual |
|---|---|---|---|
| 0 | 0 | 0 | 0 |
| 1 | 0 | 0 | 0 |
| 2 | 60 | 60 | 59 |
| 3 | 60 | 40 | 30 |
| 4 | 60 | 0 | 8 |
| 5 | 60 | 0 | 2 |
| Total: | 240% | | |

TABLE 3

| Priority | Offered | Ideal | Actual |
|---|---|---|---|
| 0 | 20 | 20 | 20 |
| 1 | 50 | 50 | 50 |
| 2 | 20 | 20 | 19 |
| 3 | 50 | 10 | 9 |
| 4 | 20 | 0 | 2 |
| 5 | 50 | 0 | 0 |
| Total: | 210% | | |

TABLE 4

| Priority | Offered | Ideal | Actual |
|---|---|---|---|
| 0 | 60 | 60 | 59 |
| 1 | 60 | 40 | 29 |
| 2 | 60 | 0 | 9 |
| 3 | 60 | 0 | 2 |
| 4 | 60 | 0 | 1 |
| 5 | 60 | 0 | 0 |
| Total: | 360% | | |

Table 1 shows that all six pipes offer traffic, and that moderate oversubscription leads to a good approximation of absolute priority allocation. Table 2 shows that only four pipes offer traffic; moderate over-subscription leads to an approximation of absolute priority allocation with some "leakage" of packets in pipe 4 that should actually not be allowed. In Table 3, all six pipes offer traffic; only the first four pipes should ideally have packets processed, moderate over-subscription. And in Table 4, all six offer traffic, where only the first two pipes should ideally have packets processed: high over-subscription.

Bandwidth allocation is reasonably good for moderate over-subscription (up to around 200%), but accuracy declines above 200%. Still, it is a computationally inexpensive way to approximate absolute priorities.

Referring now to FIG. 6, another embodiment 200 of the present invention is illustrated which incorporates the concepts of minimum (mm) bandwidth and maximum (max) bandwidth for different priority classes. At a point prior to the adjustment of transmit fractions, such as prior to step 116 in method 111, the bandwidth of a priority class is identified in step 202 and compared to specified mm and max bandwidths in step 204. If bandwidth<=mm, then the transmit fraction of the priority class could be increased aggressively, for example, by adding a positive constant to it every time step or by making it 1 in the next time step, and the method 111 of linear increase is bypassed. The priority of each class relative to the others classes is irrelevant, since all pipes should pass all of their packets.

If bandwidth>max, then the transmit fraction could be decreased aggressively, for example, by multiplying it by a number in (0, 1) in every time step until bandwidth is correctly<=max, and the method 1 of exponential decrease is bypassed. Again, all pipes are similarly limited regardless of priority. This may occur when, for example, malicious traffic is detected within the system by traffic in excess of proper bandwidth for a given class of traffic or customer. It may also ensure that all guaranteed minimum flows are met for each pipe in the event of a sudden surge beyond the capabilities of the system. The linear increase/exponential decrease of transmit probabilities according to the present invention is intended where traffic is between minimum and maximum bandwidths, or where the minimum is set to zero and maximum to infinity. It is in this situation that it may be desirable to favor some pipes over other pipes, and the present invention allows the transmit probabilities to be increased and decreased according to their relative priorities, where the highest priority pipes are favored.

A method and system has been disclosed for controlling traffic through a network. Software written according to the present invention is to be stored in some form of computer-readable medium, such as memory, CD-ROM or transmitted over a network, and executed by a processor. Alternatively, some or all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling a plurality of pipes in a computer network including at least one processor for a switch, the at least one processor having a queue, comprising the steps of:
    (a) assigning each pipe a priority ranking class label from a label set of (0, 1, 2, . . . N-1), wherein a highest priority pipe is assigned 0 and remaining pipes are assigned 1 through N-1 in an ascending label order corresponding to a descending order of pipe priority ranking, wherein N is the number of pipes, wherein each class has a unique priority rank with respect to each of the other classes, said ranks ranging from a highest priority rank to a lowest priority rank;
    (b) calculating a transmission probability for each pipe responsive to its priority rank;
    (c) determining if excess bandwidth exists for the queue;
    (d) if excess bandwidth exists linearly increasing the transmission probability for each pipe by
        (d1) calculating a linear coefficient Ci for each pipe (i) from the formula: $C0=1/128$ and $Ci+1=Ci/2$ for (i)=(0, 1, . . . , N-2); and
        (d2) increasing the transmit probability of each pipe linearly with its coefficient Ci;
    (e) If excess bandwidth does not exist exponentially decreasing transmission probability for each pipe by
        (e1) calculating an exponential coefficient Di for each pipe (i) from the formula: $DN-1=1/128$ and $Di=(Di+1)/2$ for (i)=(N-2, N-3, . . . , 0); and
        (e2) decreasing the transmit probability of each pipe (i) exponentially with its coefficient Di;
    (f) transferring a packet to the queue from a pipe responsive to the pipe transmission probability and priority rank; and
    (g) transmitting the packet from the queue.

2. The method of claim 1 wherein the steps of linearly increasing or exponentially decreasing the transmission probability for each pipe increase the transmission probability for the higher ranked pipes faster than that of the lower ranked pipes, or decrease the transmission probability for the higher ranked pipes slower than that of the lower ranked pipes.

3. The method of claim 1 wherein the step of linearly increasing or exponentially decreasing the transmission probability for each pipe is responsive to a current transmission probability for each pipe and a previous transmission probability for each pipe.

4. The method of claim 3 wherein the step of determining excess bandwidth further includes the steps of
   (a) setting a bandwidth value to 1 if excess bandwidth exists; and
   (b) setting a bandwidth value to zero if excess bandwidth does not exist; and
   wherein the steps of linearly increasing or exponentially decreasing the transmission probability for each pipe comprise recalculating the transmission probability for each pipe responsive to the bandwidth value according to the following equations:

If $B=1$, then $Ti(t+Dt)=\text{minimum } \{Ti(t)+Ci, 1\}$;

If $B=0$, then $Ti(t+Dt)=\text{maximum } \{0, Ti(t)-Di*fi/S\}$;

wherein Dt is a length of time since the previous transmission probability for each pipe was calculated, fi denotes an amount of traffic of type (i) that was transmitted during a time interval [t–Dt, t ] divided by Dt, and S denotes a maximum possible rate of traffic of all types that could be sent to or from the queue.

5. The method of claim 4 further comprising the step of setting a minimum flow and a maximum flow for each of the plurality of pipes; and wherein the step of determining if excess bandwidth exists for the queue further comprises the steps of comparing a pipe bandwidth to a minimum flow and a maximum flow, wherein if the pipe bandwidth is less than or equal to the minimum flow, then the transmit probability of the pipe is increased and the steps of linearly increasing or exponentially decreasing the transmission probability for each pipe are bypassed, and wherein if the pipe bandwidth is greater than the maximum flow, then the transmit probability of the pipe is decreased and the steps of linearly increasing or exponentially decreasing the transmission probability for each pipe are bypassed.

6. A memory containing a program for controlling a plurality of pipes in a computer network including at least one processor for a switch, the at least one processor having a queue, the plurality of pipes utilizing the queue for transmitting traffic through the switch, the program including instructions for:
   (a) assigning each pipe a priority ranking class, wherein each class has a unique priority rank with respect to each of the other classes, said ranks ranging from a highest priority rank to a lowest priority rank;
   (b) calculating a transmission probability for each pipe responsive to its priority rank;
   (c) determining if excess bandwidth exists for the queue;
   (d) linearly increasing the transmission probability for each pipe if excess bandwidth exists or exponentially decreasing transmission probability for each pipe if excess bandwidth does not exist; and
   (e) transferring a packet to the queue from a pipe responsive to the pipe transmission probability and priority rank;
   wherein the instructions for assigning each pipe a priority ranking class comprise instructions assigning labels from the set of (0, 1, 2, ... N-1), wherein the highest priority rank is assigned 0 and the remaining ranks are assigned 1 through N-1 in an ascending label order corresponding to a descending order of pipe priority ranking, where N is the number of pipes; and the instructions for linearly increasing or exponentially decreasing the transmission probability for each pipe further comprises instructions wherein:
   (d1) if excess bandwidth exists, a linear coefficient Ci is calculated for each pipe (i) from the formula:

$C0=1/128$ and $Ci+1=Ci/2$ for $(i)=0, 1, \ldots, N-2$;

and the transmit probability of each pipe is increased linearly with its coefficient Ci; and
   (d2) if excess bandwidth does not exist, an exponential coefficient Di is calculated for each pipe (i) from the formula:

$DN-1=1/128$ and $Di=(Di+1)/2$ for $(i)=N-2, N-3, \ldots, 0$ and the transmit probability of each pipe (i) is decreased exponentially with its coefficient Di.

7. The memory containing a program of claim 6 wherein the instructions for linearly increasing or exponentially decreasing the transmission probability for each pipe provide instruction to increase the transmission probability for the higher ranked pipes at a rate faster than a rate of increase for the lower ranked pipes, or decrease the transmission probability for the higher ranked pipes at a rate slower than a rate of decrease for the lower ranked pipes.

8. The memory containing the program of claim 6 wherein the instructions for linearly increasing or exponentially decreasing the transmission probability for each pipe are responsive to a current transmission probability for each pipe and a previous transmission probability for each pipe.

9. The memory containing the program of claim 8 wherein the instructions for determining excess bandwidth further include instructions for:
   (a) setting a bandwidth value to 1 if excess bandwidth exists; and
   (b) setting a bandwidth value to zero if excess bandwidth does not exist; and
   wherein the instructions for linearly increasing or exponentially decreasing the transmission probability for each pipe further comprise instructions for recalculating the transmission probability for each pipe responsive to the bandwidth value according to the following equations:

If $B=1$, then $Ti(t+Dt)=\text{minimum } \{Ti(t)+Ci, 1\}$;

If $B=0$, then $Ti(t+Dt)=\text{maximum } \{0, Ti(t)-Di*fi/S\}$;

wherein Dt is a length of time since the previous transmission probability for each pipe was calculated, fi denotes an amount of traffic of type (i) that was transmitted during a time interval [t–Dt, t] divided by Dt, and S denotes a maximum possible rate of traffic of all types that could be sent to or from the queue.

10. The memory containing the program of claim 9 further comprising instructions for setting a minimum flow and a maximum flow for each of the plurality of pipes; and wherein the instructions for determining if excess bandwidth exists for the queue further comprises instructions for comparing a pipe bandwidth to a minimum flow and a maximum flow, wherein if the pipe bandwidth is less than or equal to the minimum flow, then the transmit probability of the pipe is increased and the step of linearly increasing or exponentially decreasing the transmission probability for each pipe is bypassed, and wherein if the pipe bandwidth is greater than the maximum flow, then the transmit probability of the pipe is decreased and the step of linearly increasing or exponentially decreasing the transmission probability for each pipe is bypassed.

11. A system for controlling a plurality of pipes in a computer network including a switch crossed by the plurality of pipes, the system comprising:
 (a) a queue connected to the plurality of pipes for transmitting traffic through the switch;
 (b) a priority mechanism configured to assign each pipe a priority ranking class integer (i) from a set of (0, 1, 2, . . . N-1), a highest priority pipe assigned 0 and remaining pipes assigned 1 through N-1 in an ascending label order corresponding to a descending order of pipe priority ranking, wherein N is a total number of pipes and each class has a unique priority rank with respect to each of the other classes, said ranks ranging from a highest priority rank to a lowest priority rank;
 (c) a mechanism for determining if excess bandwidth exists for the queue; and
 (d) a mechanism for calculating a transmission probability for each pipe responsive to its priority rank configured to calculate a linear coefficient $C_i$ for each pipe (i), wherein $C_0 = 1/128$ and $C_{i+1} = C_i/2$ for (i)=(0, 1, . . . , N-2) and linearly increase a transmission probability for each pipe with its coefficient $C_i$ if the mechanism for determining if excess bandwidth exists determines that queue excess bandwidth exists; or calculate an exponential coefficient $D_i$ for each pipe (i) wherein $D_{N-1} = 1/128$ and $D_i = (D_{i+1})/2$ for (i)=N-2, N-3, . . . , 0 and exponentially decrease the transmission probability for each pipe if the mechanism for determining if excess bandwidth exists determines that queue excess bandwidth does not exist, and transfer a packet to the queue from a pipe responsive to the pipe transmission probability and priority rank.

12. The system of claim 11 wherein the mechanism for calculating a transmission probability for each pipe is configured to linearly increase or exponentially decrease the transmission probability for the higher ranked pipes at a rate faster than a rate of increase for the lower ranked pipes, or decrease the transmission probability for the higher ranked pipes at a rate slower than a rate of decrease for the lower ranked pipes.

13. The system of claim 11 wherein the mechanism for calculating a transmission probability for each pipe is configured to linearly increase or exponentially decrease the transmission probability for each pipe responsive to a current transmission probability for each pipe and a previous transmission probability for each pipe.

14. The system of claim 13 wherein the mechanism for determining excess bandwidth is configured to:
 (a) set a bandwidth value to 1 if excess bandwidth exists; and
 (b) set a bandwidth value to zero if excess bandwidth does not exist; and
 wherein the mechanism for calculating a transmission probability for each pipe is configured to linearly increase or exponentially decrease the transmission probability for each pipe responsive to the bandwidth value according to the following equations:

If $B=1$, then $T_i(t+Dt) = \text{minimum} \{T_i(t)+C_i, 1\}$;

If $B=0$, then $T_i(t+Dt) = \text{maximum} \{0, T_i(t)-D_i \ast f_i/S\}$;

wherein $Dt$ is a length of time since the previous transmission probability for each pipe was calculated, $f_i$ denotes an amount of traffic of type (i) that was transmitted during a time interval $[t-Dt, t]$ divided by $Dt$, and $S$ denotes a maximum possible rate of traffic of all types that could be sent to or from the queue.

15. The system of claim 14 further comprising a mechanism for setting a minimum flow and a maximum flow for each of the plurality of pipes; wherein the mechanism for determining if excess bandwidth exists is configured to compare a pipe bandwidth to a minimum flow and a maximum flow; wherein the mechanism for calculating a transmission probability is configured to increase the transmit probability of the compared pipe if the pipe bandwidth is less than or equal to the minimum flow and decrease the transmit probability of the compared pipe if the pipe bandwidth is greater than the maximum flow.

* * * * *